United States Patent
Schmidtberger et al.

(10) Patent No.: US 11,821,510 B1
(45) Date of Patent: Nov. 21, 2023

(54) GEARBOX TORQUE SENSOR

(71) Applicant: Eskridge, Inc., Olathe, KS (US)

(72) Inventors: Jesse Schmidtberger, Olathe, KS (US); Marshall Kolb, Overland Park, KS (US); Jared Armstrong, Eudora, KS (US)

(73) Assignee: Eskridge, Inc., Olathe, KS (US)

( * ) Notice: Subject to any disclaimer, the term of this patent is extended or adjusted under 35 U.S.C. 154(b) by 281 days.

(21) Appl. No.: 16/658,831

(22) Filed: Oct. 21, 2019

Related U.S. Application Data

(63) Continuation-in-part of application No. 15/256,203, filed on Sep. 2, 2016, now abandoned.

(51) Int. Cl.

| | |
|---|---|
| *G01L 3/14* | (2006.01) |
| *G01L 3/18* | (2006.01) |
| *F16H 59/16* | (2006.01) |
| *F16H 59/14* | (2006.01) |
| *B25J 19/00* | (2006.01) |
| *F16H 35/00* | (2006.01) |
| *F16H 57/02* | (2012.01) |

(Continued)

(52) U.S. Cl.
CPC ............ *F16H 59/16* (2013.01); *B25J 19/00* (2013.01); *B25J 19/0004* (2013.01); *B25J 19/02* (2013.01); *F16H 35/18* (2013.01); *F16H 57/02* (2013.01); *F16H 57/021* (2013.01); *F16H 57/025* (2013.01); *F16H 59/14* (2013.01); *F16H 2035/005* (2013.01); *F16H 2057/0203* (2013.01); *F16H 2057/02069* (2013.01); *F16H 2059/147* (2013.01); *F16H 2059/148* (2013.01); *F16H 2063/508* (2013.01); *F16H 2700/00* (2013.01)

(58) Field of Classification Search
None
See application file for complete search history.

(56) References Cited

U.S. PATENT DOCUMENTS

| | | | |
|---|---|---|---|
| 4,324,133 | A | 4/1982 | Stevenson |
| 4,559,812 | A | 12/1985 | Kitchen |

(Continued)

FOREIGN PATENT DOCUMENTS

| | | |
|---|---|---|
| EP | 0162519 A1 | 11/1985 |
| JP | 59187239 A | 10/1984 |

(Continued)

*Primary Examiner* — Jill E Culler
*Assistant Examiner* — Ruben C Parco, Jr.
(74) *Attorney, Agent, or Firm* — GableGotwals

(57) ABSTRACT

A system and method of measuring torque generated by a drive train like that used in a rotating equipment drive. A drive motor is mounted to a rotatable brake assembly which, in turn, is coupled to a gear drive which, in turn, transmits rotational power. The brake assembly is coupled to a fixed cover of the gear drive by a gearbox torque sensor that prevents rotation between the brake assembly and the housing. The sensor can be a load cell or its equivalent. A control module may be configured to adjust operation of the rotating equipment drive in response to the torque signal. All input torque from the drive motor to the gearbox is measured when the brake is disengaged through the load cell. All input torque at the gearbox output shaft, through back-driving, is measured when the brake is engaged through the load cell.

20 Claims, 7 Drawing Sheets

(51) Int. Cl.
*F16H 57/021* (2012.01)
*F16H 35/18* (2006.01)
*B25J 19/02* (2006.01)
*F16H 57/025* (2012.01)
*F16H 63/50* (2006.01)

(56) References Cited

U.S. PATENT DOCUMENTS

| | | | | |
|---|---|---|---|---|
| 4,588,057 | A | * | 5/1986 | Weich ..................... F16D 55/30 477/199 |
| 4,635,472 | A | * | 1/1987 | Scourtes ........... G01M 17/0072 73/116.06 |
| 4,754,652 | A | * | 7/1988 | Coulter ..................... G01L 3/10 73/862.191 |
| 4,787,245 | A | | 11/1988 | Anderson et al. |
| 5,003,829 | A | * | 4/1991 | DeConti ............... F16D 65/128 188/264 D |
| 5,163,570 | A | * | 11/1992 | Mundis ................. B66F 17/006 212/278 |
| 6,123,163 | A | | 9/2000 | Otsu et al. |
| 6,267,709 | B1 | | 7/2001 | Jacques et al. |
| 6,532,830 | B1 | * | 3/2003 | Jansen .................. G01L 5/1627 73/862.042 |
| 7,140,994 | B2 | | 11/2006 | Mundis |
| 7,214,166 | B2 | | 5/2007 | Steen et al. |
| 7,273,442 | B2 | | 9/2007 | Steen et al. |
| 7,644,630 | B2 | | 1/2010 | Agricole et al. |
| 7,757,823 | B2 | | 7/2010 | Choi |
| 8,894,654 | B2 | | 11/2014 | Anderson |
| 9,383,278 | B1 | | 7/2016 | Schiller |
| 2005/0282678 | A1 | * | 12/2005 | Mundis ................... F16D 55/36 475/269 |
| 2006/0191359 | A1 | | 8/2006 | Tarasinski et al. |
| 2013/0116937 | A1 | | 5/2013 | Calhoun et al. |
| 2013/0317519 | A1 | | 11/2013 | Romo et al. |
| 2015/0068325 | A1 | * | 3/2015 | Mustalahti ............... B66D 5/14 73/862.56 |

FOREIGN PATENT DOCUMENTS

| | | | | |
|---|---|---|---|---|
| KR | 101058559 B1 | | 8/2011 | |
| WO | WO-2015192034 A1 | * | 12/2015 | ............. B66C 15/06 |

* cited by examiner

GEARBOX TORQUE SENSOR

CROSS-REFERENCE TO CO-PENDING APPLICATIONS

This application claims priority to, and is a continuation-in-part of, U.S. Ser. No. 15/256,203 filed Sep. 2, 2016, the contents of which are incorporated by reference herein.

BACKGROUND

The present invention relates generally to devices for measuring torque being transmitted through a gear drive train.

Technological improvements in vehicle and machinery controls systems have allowed equipment manufactures to measure, log and safely control rotating machinery components such as winches, swing drives, and thrust drives. Often these controls are used to prevent the overloading of rotational machinery by measuring and controlling torque transmitted through the system. Therefore, a need exists to measure the torque transmitted through these rotational machineries.

Gear drive trains are commonly used to transmit rotational power from a drive motor to a piece of rotating equipment or a rotating tool. Overloading the drive train can cause the train's drive motor to stall or overheat. It can also cause the equipment or tool to break. When the brake is used in conjunction with a speed reducer gearbox such as, but not limited to, a swing drive on a crane, back-driving of the gearbox can occur. Back-driving happens when power to the swing drive motor is turned off and the inertia of the crane structure is deaccelerated by using the gearbox motor as a pump. It also occurs when a crane is operated on a sloped terrain, by striking an object with the crane boom while articulating, through picking up an object not directly located under the tip of the crane boom, and by driving the vehicle to pull a load connected to the crane boom. Back-driving loads will intentionally cause the brakes to slip, extreme care must be taken in the design of the hydraulic circuitry to prevent overloading the gearbox from an accumulation of torque from the brake and associated hydraulics. Therefore, it's beneficial to measure and monitor the amount of torque being transmitted through the drive train.

The prior art tries to approximate drive train torque by measuring the pressure of the hydraulic fluid driving a hydraulic drive motor. Others make use of more complex mechanisms that use balls on inclined planes arranged around the centerline of the drive train. As the torque increases, the balls travel up the inclined plane. This approach has proven to be expensive to build and difficult to maintain in a work environment.

For example, U.S. Pat. No. 7,140,994 B2 to Mundis makes use of a coupler with a ball-and-seat arrangement on each half of the coupler. As drive train torque is transmitted through the coupler, the balls roll partway up the seats and the two halves of coupler move farther apart and against the pressure of a hydraulic piston urging the two halves toward one another. A hydraulic pressure gauge measures the pressure change of the piston, which then correlates to torque.

EP 162 519 A1 to Ludoph discloses a friction clutch, not a brake assembly, that includes a planetary gear system that transmits torque to a control (torque measuring) element only when the clutch system is engaged. The gear system does not transmit torque through the control element when the clutch is disengaged. A brake assembly of this disclosure is configured to transmit torque through a force or torque sensing element when the brake is engaged and disengaged.

What is needed is a simple and affordable system and method to measure drive train torque.

SUMMARY

Embodiments of a gearbox torque sensor made according to this disclosure includes a load cell arranged between the gearbox cover and brake assembly so as to prevent rotation of the brake assembly. The gearbox may be used to rotate a crane or boom structure. In some embodiments, the load cell is a compression load cell or a tension load cell that prevents rotation of the brake assembly. In yet another embodiment, the load cell is an S-beam load cell connected to a linkage that prevents rotation of the brake assembly. In another embodiment, the load cell is a load pin load cell located directly between the brake assembly and the cover.

In embodiments, all input torque from the drive motor to the gearbox is measured when the brake is disengaged through the load cell. All input torque at the gearbox output shaft, through back-driving, is measured when the brake is engaged through the load cell. Load cell force measurement may then be mathematically manipulated to determine the torque at the output shaft of the gearbox

ELEMENTS AND NUMBERING USED IN THE DRAWINGS AND DETAILED DESCRIPTION

Figure 1:
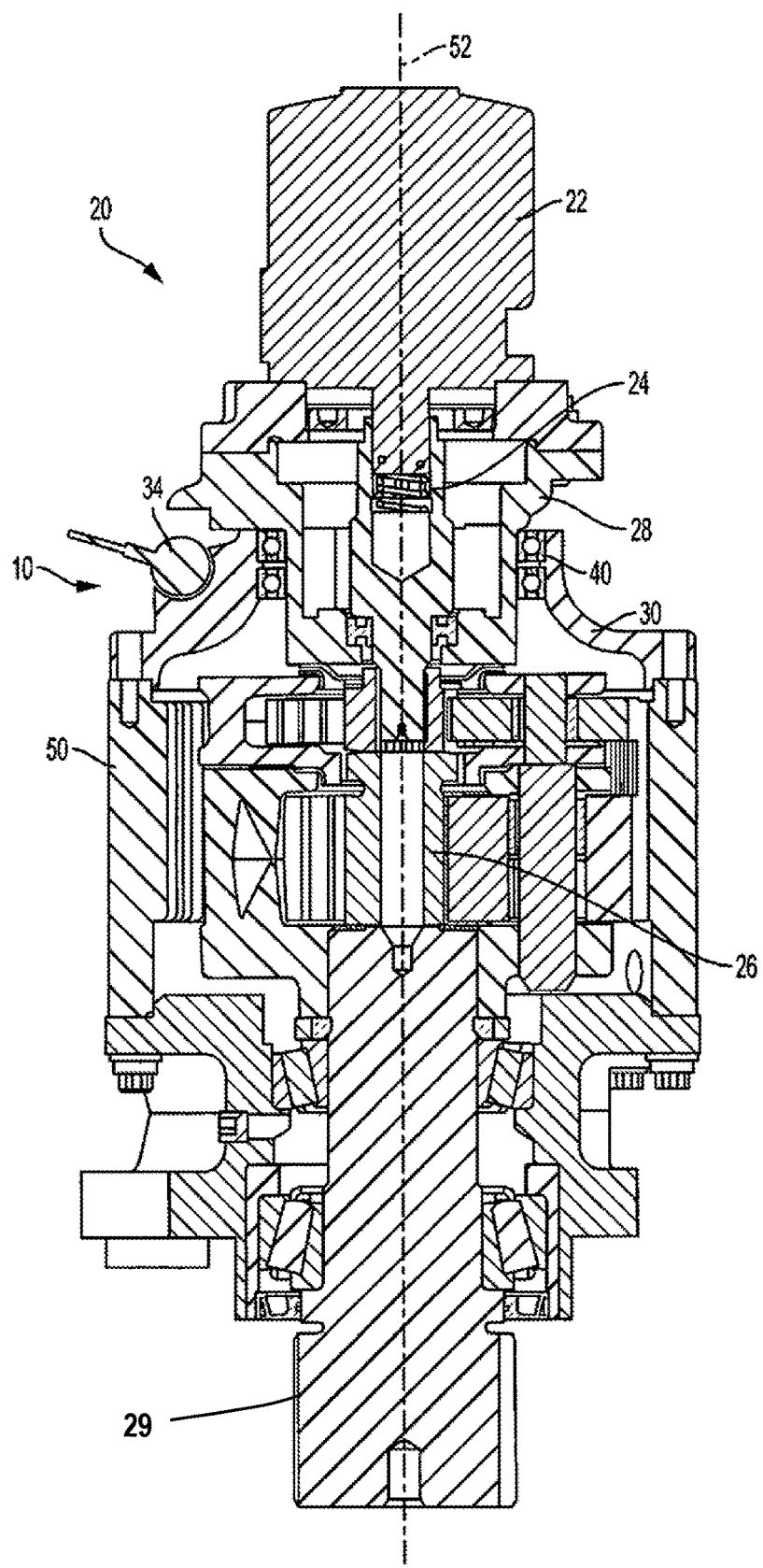
FIG. 1 is a cross-section view of a planetary gear drive train incorporating a compression load cell embodiment of gearbox torque sensor of this disclosure to determine system torque.
Figure 2:
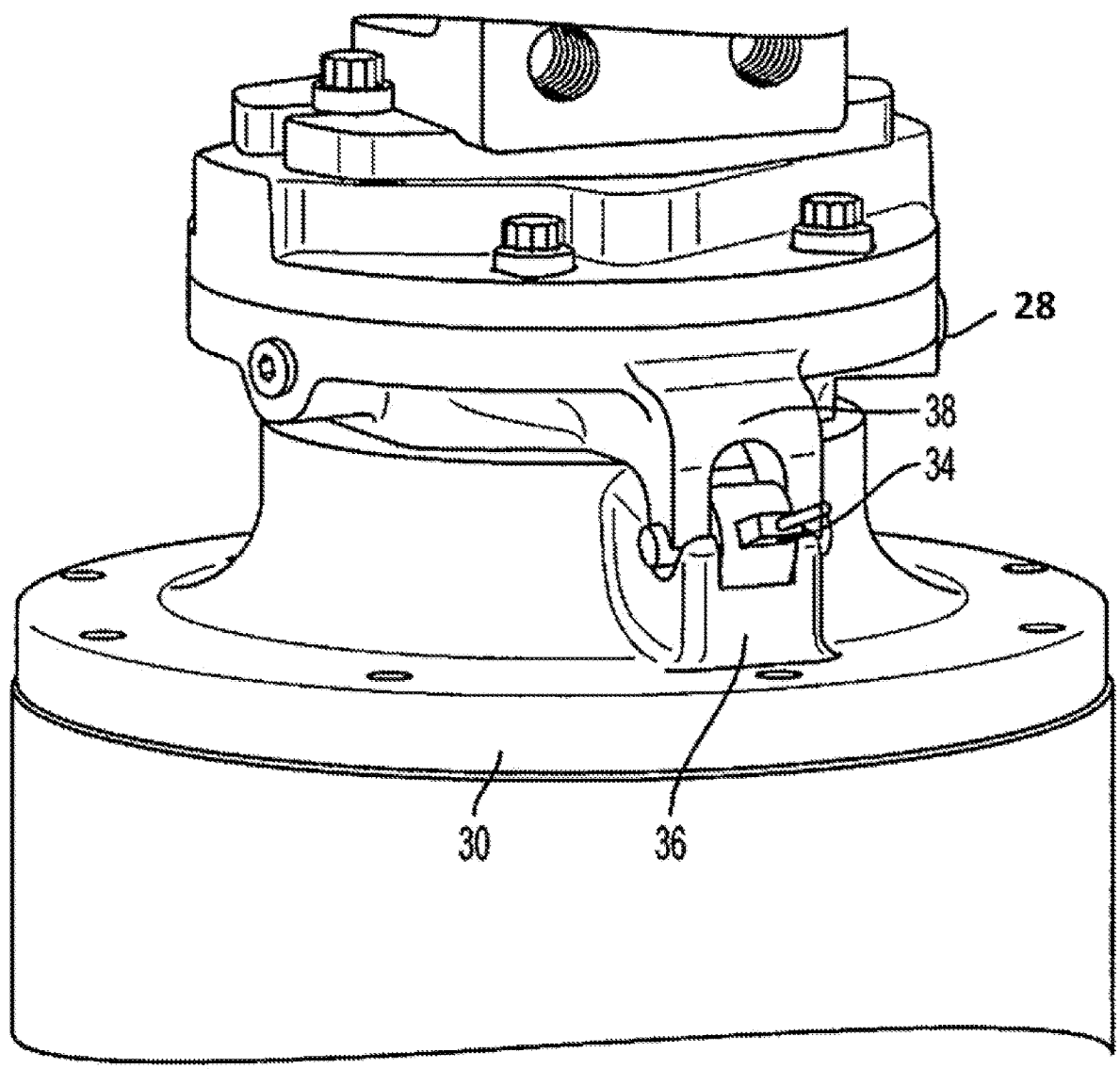
FIG. 2 is a partial isometric view of a brake assembly and load cell.

10 Gearbox or gear drive train torque sensor
20 Drive train

22 Drive motor
24 Brake assembly (multi-disk spring-apply)
26 Gear drive (internal gearing connected output gear)
28 Brake assembly case
29 Output gear or pinion
30 Gear drive cover
32 Linkage
34 Load cell or transducer
36 First end (connected to 30)
38 Second end (connected to 24)
40 Bearing mount (e.g., bearing, sleeve or bushing)
42 Signal
44 Display
46 Control module
48 Absolute value circuit
50 Support structure or gear drive housing
52 Central longitudinal axis
56 Output signals

DETAILED DESCRIPTION

By way of a non-limiting example, a brake assembly including a gear torque sensor of this disclosure may be used to control the position of a crane. The crane structure may be mounted on a slewing gear and the gearbox output shaft controls the rotation and positioning of the slew gear and crane structure. The brake is engaged when the hydraulic motor is not being powered. The brake resists rotation of the gearbox and holds the crane structure in position. Any external loads applied to the crane structure will transmit a torque onto the gearbox output shaft. The brake will resist the torque and the force on the output shaft will be measured by the gearbox load cell.

When the brake is disengaged, torque is being transmitted through the gearbox from the hydraulic motor and the gear box rotates the crane structure. The input torque can be measured by the load cell because the hydraulic motor is mounted to the brake housing and the load cell prevents the brake housing from rotating on the gearbox cover. Both of these measurements, along with a braking system that is adjustable, can allow crane designers to better control the loading placed on the crane structures.

In one embodiment of the system and method, a gearbox torque sensor is connected between a rotatable brake assembly of the gear drive train and a fixed cover of the gear drive train so as to prevent the rotatable brake assembly from rotating relative to the fixed cover. The sensor includes a load cell through which the rotational force experienced by the brake assembly is transferred through the device. The gearbox torque sensor preferably lies on the outside of the brake assembly and cover.

In embodiments, the gear drive train may be a swing drive train or swing reducer connected to a swing motor, with the brake assembly being a swing brake.

Referring first to FIGS. 1 & 5A-6C, a drive train 20 is equipped with a gearbox torque sensor 10 connected between the brake assembly case 28 and the gear drive cover 30 to prevent rotation of the brake assembly 24 relative to the gear drive's cover 30 so as to measure the torque transmitted by the drive motor 22 and drive train output gear 29 to the drive train's gear drive 26. Gear drive 26 is connected to an output gear 29 which, in turn, can be connected to a piece of rotating equipment or tool (not shown). The rotating equipment may be a crane or boom. The drive motor 22 may be a hydraulic motor. Rotational forces from the drive motor 22 force the brake assembly 24 to rotate. However, with the sensor 10 installed on the brake assembly case 28 and on the gear drive cover 30 to which the brake assembly 24 is mounted, the sensor 10 will resist rotation of the brake assembly 24, forcing the torque to go through the gear drive 26. The rotational force that the sensor 10 is experiencing results from the torque moving through the gear drive 26. When the brake assembly 24 is then engaged, the external load applied to the output gear or pinion 29 of the gear drive 26 is transferred up through the gear drive 26 into the brake assembly 24 due to back driving forces. Therefore, the sensor 10 senses torque when the brake assembly 24 is disengaged and when it is engaged.

The brake assembly 24—which passes through a bearing mount 40 that maintains coaxial alignment between the brake assembly 24 and gear drive 26—can rotate relative to the gear drive cover 30 when resistance to drive motor 22 torque or back-driving is encountered. The brake assembly 24 includes a brake 25. In embodiments, the brake 25 is a spring-applied hydraulic-released brake. The gear drive 26, the brake assembly 24 including the brake 25, and the gear drive motor 22 are arranged coaxial one another along a central longitudinal axis 52 of the drive train 20. In embodiments, mount 40 may include or be a bearing, sleeve or bushing. The gear drive cover 30 cannot rotate; it is rigidly mounted to a support structure or housing 50. The cover 30 positions the brake assembly 24, which is free to rotate radially. By connecting the brake assembly 24 to the cover 30 by way of the gearbox torque sensor 10, rotation of the brake assembly 24 is prevented and rotational force is measured by sensor 10. Drive and back-driving torque are calculated by multiplying this measured rotational force by the distance of this force from the center longitudinal axis 52 of the gear drive 26.

Figure 3:
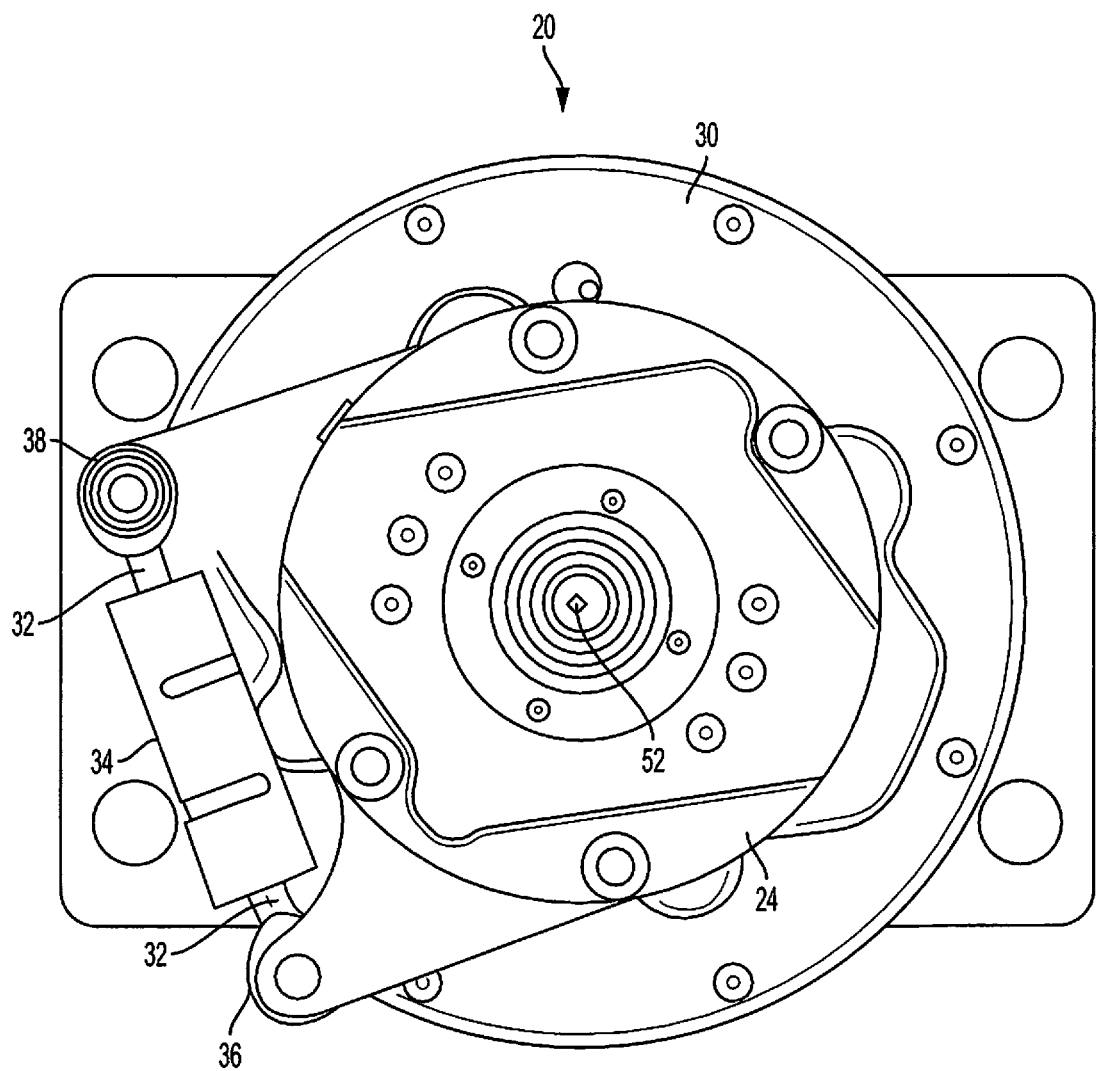
FIG. 3 is a top view of another preferred embodiment of the gearbox torque sensor using a S-Beam load cell to determine system torque.
Figure 7B:
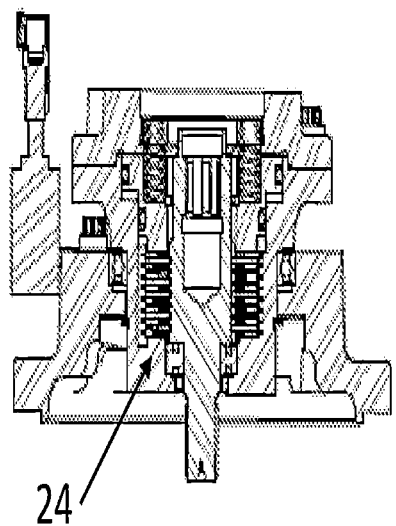
FIG. 7B is a cross-section view of the brake assembly and tension load cell of FIG. 7A.
Figure 7C:
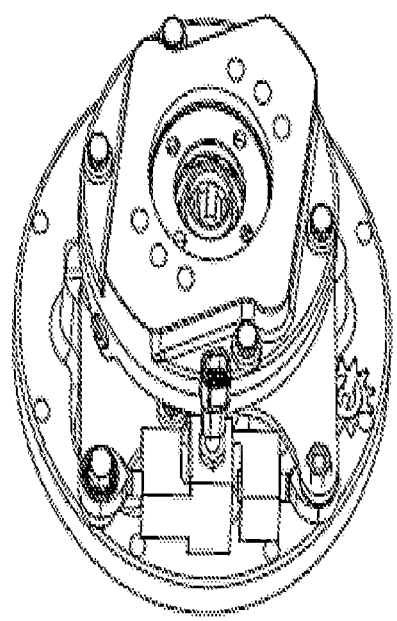
FIG. 7C is an isometric view of the brake assembly and tension load of FIG. 7A.
Figure 7A:
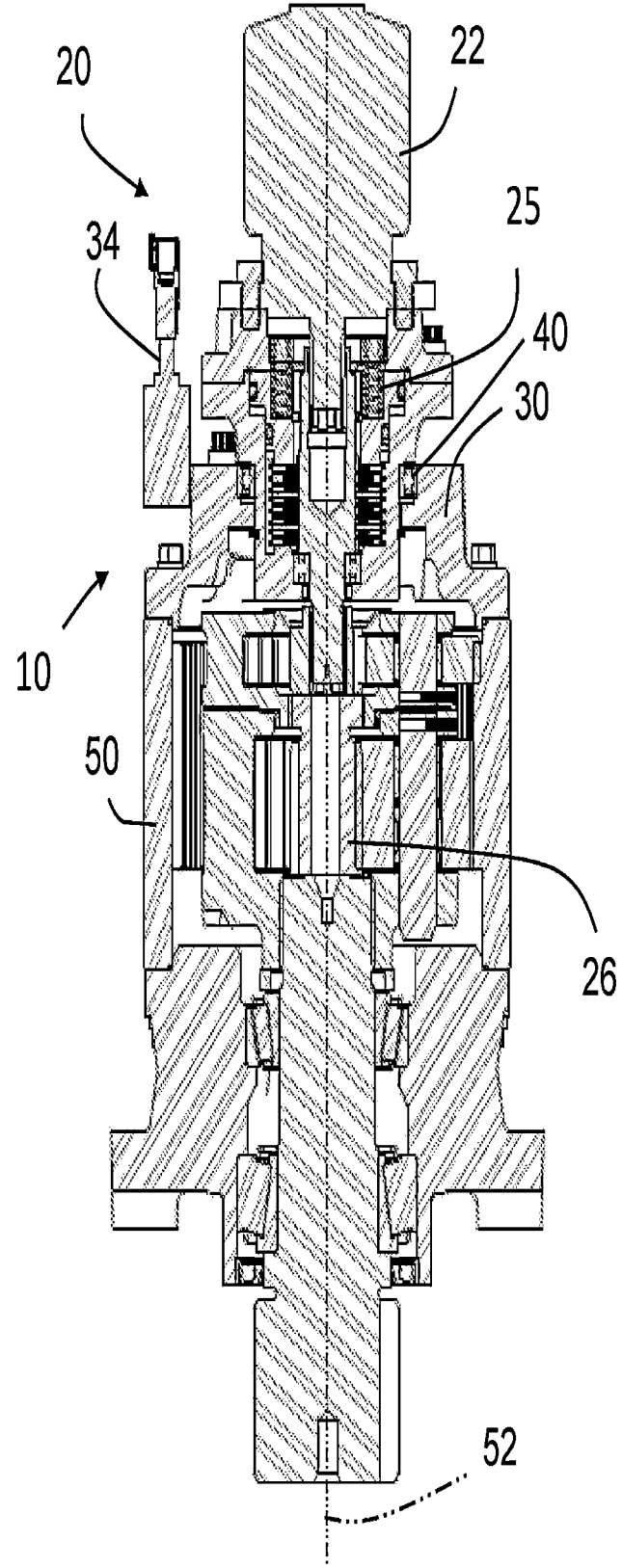
FIG. 7A is a cross-section view of a planetary gear drive train incorporating a tension load embodiment of a gearbox torque sensor of this disclosure to determine system torque.

In one embodiment of the gearbox torque sensor 10, shown in FIGS. 1A-C, 2, 5A-6C, a load cell 34 is connected at its ends 36, 38 between the brake assembly case 28 and the gear drive cover 30. In another embodiment, shown in FIG. 3, the brake assembly case 28 is coupled to the gear drive cover 30 by a linkage 32 in communication with the load cell 34. Linkage 32 is preferably a rod end bearing or its equivalent (e.g. a HEIM®-type bearing or joint) with ends 36, 38 connected to the case 28 and cover 30. In each embodiment of the sensor 10, the load cell 34 measures the force or load transferred between the motor 22/brake assembly 24 and the case 28/cover 30. In another embodiment, shown in FIG. 5A-C, load cell 34 is a pin load that couples the brake assembly case 28 to the cover 30. The load cell 24 restricts the rotational motion and measures the force at the input of the gear drive 26. In another embodiment, a tension load design may be used. See FIGS. 7A-C.

Figure 4:
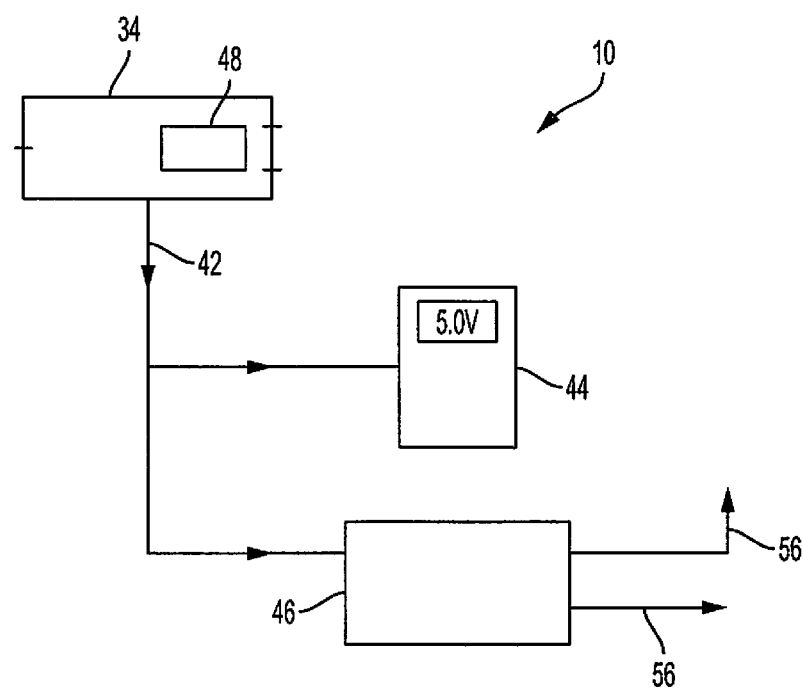
FIG. 4 is s schematic of the wiring of a load cell, control module and display of this disclosure.
Figure 5B:
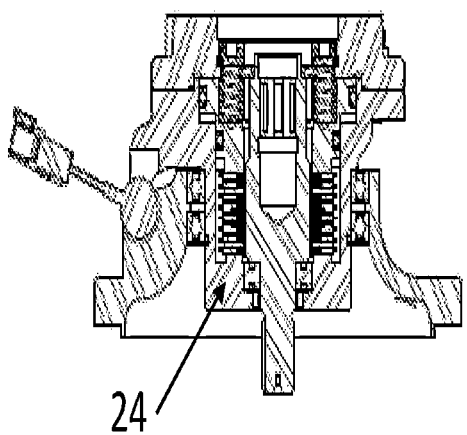
FIG. 5B is a cross-section view of the brake assembly and compression load cell of FIG.
Figure 5C:
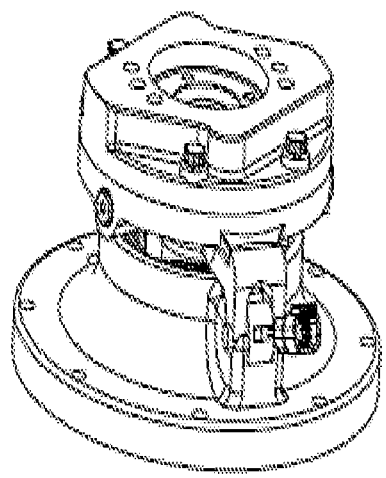
FIG. 5C is an isomeric view of the brake assembly and compression load cell of FIG. 1A.
Figure 5A:
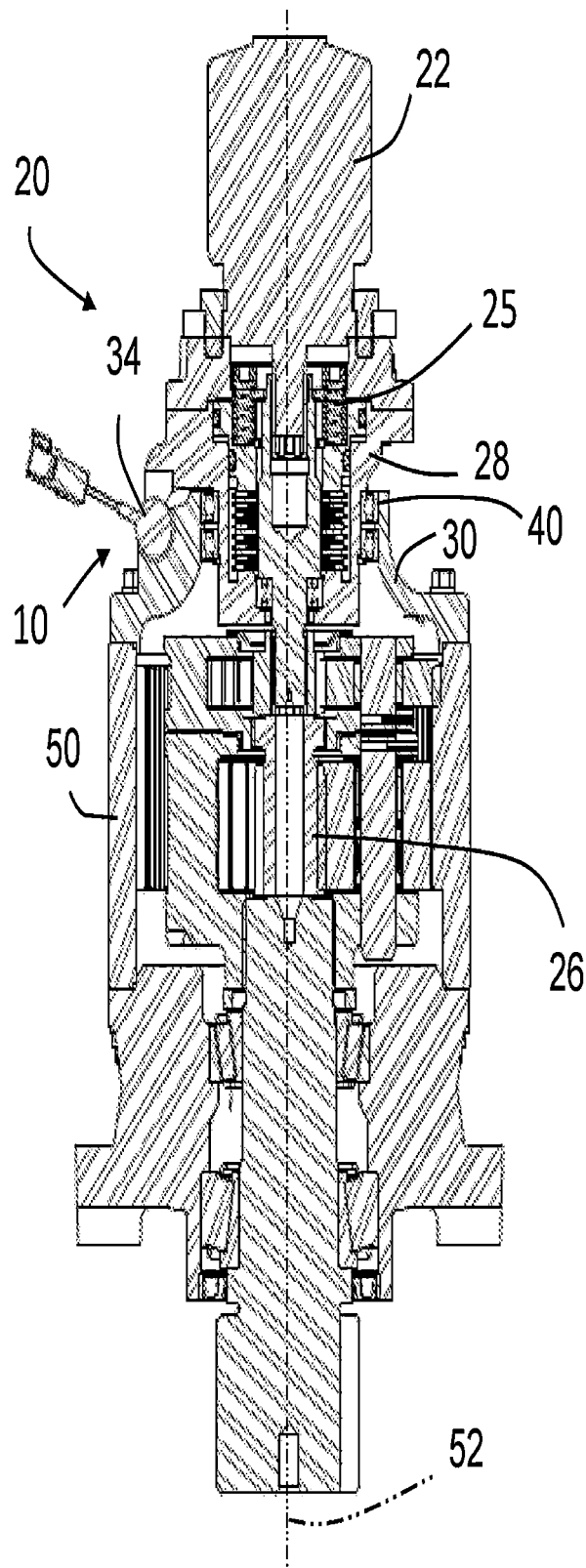
FIG. 5A is a cross-section view of a planetary gear drive train incorporating a compression load cell embodiment of gearbox torque sensor of this disclosure to determine system torque.
Figure 6A:
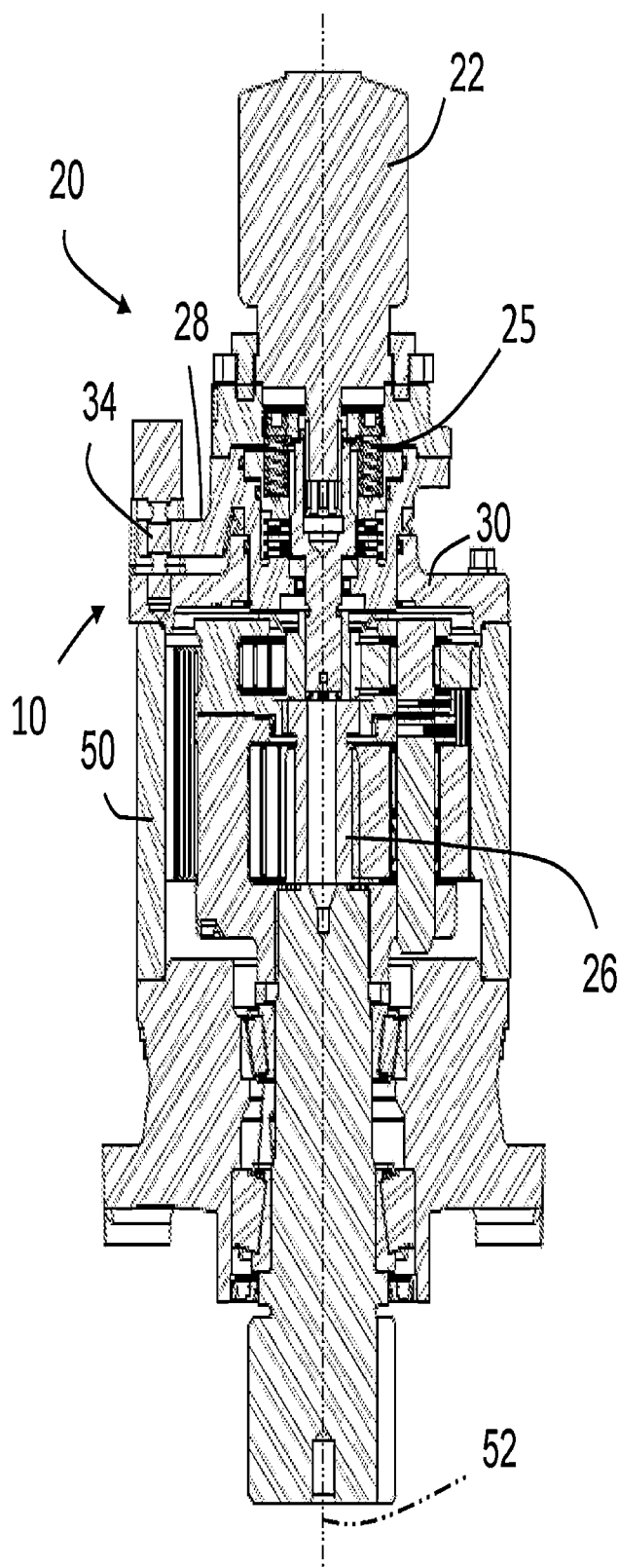
FIG. 6A is a cross-section view of a planetary gear drive train incorporating another a pin load embodiment of a gearbox torque sensor of this disclosure to determine system torque.
Figure 6B:
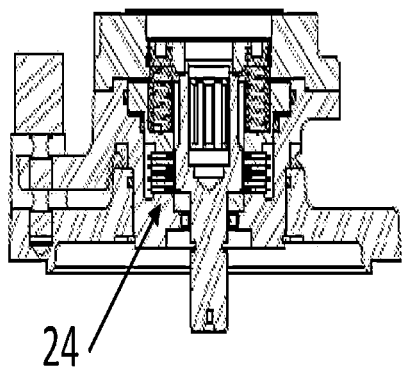
FIG. 6B is a cross-section view of the brake assembly and compression load cell of FIG. 6A.
Figure 6C:
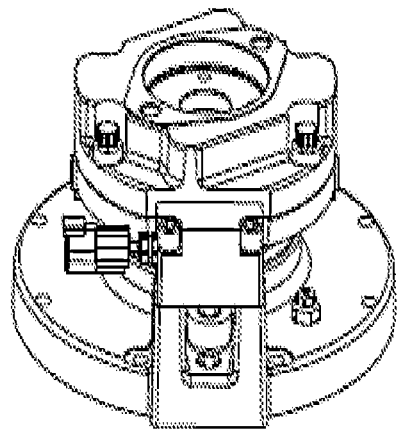
FIG. 6C is an isometric view of the brake assembly and pin load of FIG. 6A.

Referring now to FIG. 4, the load cell 34 can produce a low voltage signal 42 proportional to the load being transferred through the cell 34. The signal 42 may be transmitted to a display 44 so an equipment operator can monitor the load being placed on the drive train 20. A control module 46, which can include a PLC, integrated circuit board, or a microprocessor with associated software (or their equivalent) can adjust the operation of the drive train 20 to avoid stalling or damage to the drive train 20 by sending output signals 56 to various solenoids and motors. The control module 46 may also log the torque through the system.

The load cell 34 can include an absolute value circuit 48 to modify the signal 42 from negative voltage to read a positive voltage regardless of whether the load is in compression or tension (although it is anticipated the cell 34 will be in compression during normal drive train operation). This enables the load to be monitored regardless of the direction of rotation of the gear drive 20.

The above description describes preferred embodiments of a gear box torque sensor and the best mode contemplated. The invention is defined by the following claims and include the full range of equivalents to which each recited element is entitled.

What is claimed is:

1. A drive configured for use with rotational machinery subject to back-driving forces, the drive comprising:
   a gear drive train including a cover fixedly connected to a housing containing the gear drive train;
   a brake assembly rotationally mounted to the cover, for rotation relative to the cover, and coaxial to the gear drive train and configured to engage and disengage the gear drive train, the brake assembly including a brake and a case housing the brake, the case located above the cover of the gear drive train;
   a gear drive motor connected to the gear drive train and mounted to the case of the brake assembly;
   a gear box torque sensor connecting a portion of the case to the cover to prevent rotation of the brake assembly relative to the cover when the brake assembly is engaged and when the brake assembly is disengaged; and
   a control module including at least one microprocessor and associated software embedded thereon, the control module in electronic communication with the drive;
   wherein when the brake assembly is engaged, a torque transferred from an output shaft of the drive, due to the back-driving forces, passes through the gear box torque sensor as the brake assembly prevents rotation of the output shaft;
   wherein when the brake assembly is disengaged, a torque transferred from the gear drive motor passes through the gear box torque sensor as the gear box torque sensor prevents the rotation of the brake assembly; and
   the cover including a bearing mount, the brake assembly mounted in the bearing mount.

2. The drive of claim 1, further comprising the gear box torque sensor including a load cell, the load cell selected from the group consisting of a compression load cell and a tension load cell.

3. The drive of claim 2, the load cell including a pin load cell.

4. The drive of claim 2, the load cell including a linkage having one end connected to the cover and another end connected to the case.

5. The drive of claim 4, further comprising the linkage including a rod end bearing.

6. The drive of claim 1, further comprising the gear box torque sensor including an absolute value circuit configured to generate a positive value signal regardless of whether the gear box torque sensor is in tension or compression.

7. The drive of claim 1, further comprising a display in communication with at least one of the gear box torque sensor and the control module.

8. The drive of claim 1, wherein control module is configured to adjust operation of the rotating equipment drive in response to a gear box torque sensor signal.

9. A method of measuring torque of rotating machinery including a drive subject to back-driving forces, the drive comprising:
   a gear drive train including a cover fixedly connected to a housing containing the gear drive train;
   a brake assembly rotationally mounted to the cover, for rotation relative to the cover, and coaxial to the gear drive train and configured to engage and disengage the gear drive train, the brake assembly including a brake and a case housing the brake, the case located above the cover of the gear drive train;
   a gear drive motor connected to the gear drive train and mounted to the case of the brake assembly;
   a gear box torque sensor connecting a portion of the case to the cover and preventing rotation of the brake assembly relative to the cover when the brake assembly is engaged and when the brake assembly is disengaged; and
   a control module including at least one microprocessor and associated software embedded thereon, the control module in electronic communication with the drive;
   wherein when the brake assembly is engaged, a torque transferred from an output shaft of the drive, due to the back-driving forces, passes through the gear box torque sensor as the brake assembly prevents rotation of the output shaft;
   wherein when the brake assembly is disengaged, a torque transferred from the gear drive motor passes through the gear box torque sensor as the gear box torque sensor prevents the rotation of the brake assembly;
   the method comprising the control module:
   receiving a signal detected by the gear box torque sensor;
   converting the signal to a gear box torque;
   comparing the gear box torque signal to a predetermined value; and
   sending a command to at least one of component of the drive;
   wherein in response to the command, operation of the drive is adjusted; and
   the cover including a bearing mount, the brake assembly mounted in the bearing mount.

10. The method of claim 9, wherein the gear box torque sensor includes a load cell, the load cell selected from the group consisting of a compression load cell and a tension load cell.

11. The method of claim 10, the load cell including a pin load cell.

12. The method of claim 10, wherein the load cell includes a linkage having one end connected to the cover and another end connected to the case.

13. The method of claim 12, wherein the linkage includes a rod end bearing.

14. The method of claim 9, further comprising the gear box torque sensor including an absolute value circuit configured to generate a positive value signal regardless of whether the gear box torque sensor is in tension or compression.

15. The method of claim 9, further comprising displaying a gear box torque sensor reading.

16. A drive configured for use with rotational machinery subject to back-driving forces, the drive comprising:
   a gear drive train including a cover fixedly connected to a housing containing the gear drive train;
   a brake assembly rotationally mounted to the cover, for rotation relative to the cover, and coaxial to the gear drive train and configured to engage and disengage the gear drive train, the brake assembly including a brake and a case housing the brake, the case located above the cover of the gear drive train;
   a gear drive motor connected to gear drive train and mounted to the case of the brake assembly; and
   a gear box torque sensor connecting a portion of the case to the cover to prevent rotation of the brake assembly relative to the cover when the brake assembly is engaged and when the brake assembly is disengaged;

wherein when the brake assembly is engaged, a torque transferred from an output shaft of the drive, due to the back-driving forces, passes through the gear box torque sensor as the brake assembly prevents rotation of the output shaft;

wherein when the brake assembly is disengaged, a torque transferred from the gear drive motor passes through the gear box torque sensor as the gear box torque sensor prevents the rotation of the brake assembly; and the cover including a bearing mount, the brake assembly mounted in the bearing mount.

17. The drive of claim 16, further comprising:

the gear box torque sensor includes a load cell, the load cell selected from the group consisting of a compression load cell and a tension load cell.

18. The drive of claim 17, the load cell includes a pin load cell.

19. The drive of claim 18, the load cell includes a linkage having one end connected to the cover and another end connected to the case.

20. The drive of claim 16, further comprising:

a control module including at least one microprocessor and associated software embedded thereon, the control module in electronic communication with the drive.

\* \* \* \* \*